United States Patent
Hammonds

(10) Patent No.: US 6,860,345 B2
(45) Date of Patent: Mar. 1, 2005

(54) OMNI DIRECTION VEHICLE

(76) Inventor: Carl L. Hammonds, 7538 Pine Hollow Dr., Humble, TX (US) 77396

( * ) Notice: Subject to any disclaimer, the term of this patent is extended or adjusted under 35 U.S.C. 154(b) by 0 days.

(21) Appl. No.: 10/371,328

(22) Filed: Feb. 20, 2003

(65) Prior Publication Data

US 2003/0127255 A1 Jul. 10, 2003

Related U.S. Application Data

(62) Division of application No. 09/919,653, filed on Jul. 31, 2001, now Pat. No. 6,581,703.
(60) Provisional application No. 60/221,802, filed on Jul. 31, 2000.

(51) Int. Cl.$^7$ .............................................. B62D 11/02
(52) U.S. Cl. .................................................... 180/6.48
(58) Field of Search ................................ 180/907, 904, 180/6.48, 6.5, 22, 24, 24.02, 24.07, 6.66; 280/830, 838

(56) References Cited

U.S. PATENT DOCUMENTS

| 1,467,456 A | * | 9/1923 | Silvius ......................... 472/28 |
| 3,763,945 A | * | 10/1973 | Danielson .................. 180/6.66 |
| 3,820,790 A | * | 6/1974 | Peterson .................. 273/129 R |
| 5,090,185 A | * | 2/1992 | Meeks ......................... 56/16.7 |
| 5,305,805 A | * | 4/1994 | Watkins, Jr. ................ 141/231 |
| 5,381,987 A | * | 1/1995 | Carns .......................... 244/50 |
| 5,893,398 A | * | 4/1999 | Garrett, Jr. .................. 141/231 |
| 6,095,268 A | * | 8/2000 | Jones, Jr. ..................... 180/6.5 |

* cited by examiner

Primary Examiner—Lesley D. Morris
Assistant Examiner—Paul Royal, Jr.
(74) Attorney, Agent, or Firm—Gary L. Bush; Andrews Kurth LLP

(57) ABSTRACT

An omni direction vehicle with a frame having a round surface about its perimeter with no apparatus mounted on the frame extending beyond the perimeter. Two independent drive wheels located on an axis through the center of the frame are mounted at the same distance from a central vertical axis through the frame. Each wheel is powered independently of the other and can rotate at variable speeds in either direction. The vehicle is capable of movement in any direction by rotating the axis of the drive wheels to a position which is perpendicular to the desired direction of travel. The vehicle can spin about its vertical axis such that the axis of the drive wheels can be oriented at any direction without changing the original footprint of the space that the frame occupies over the ground. Thus, the vehicle requires a zero turning radius and requires only the space it occupies to change its forward orientation.

15 Claims, 9 Drawing Sheets

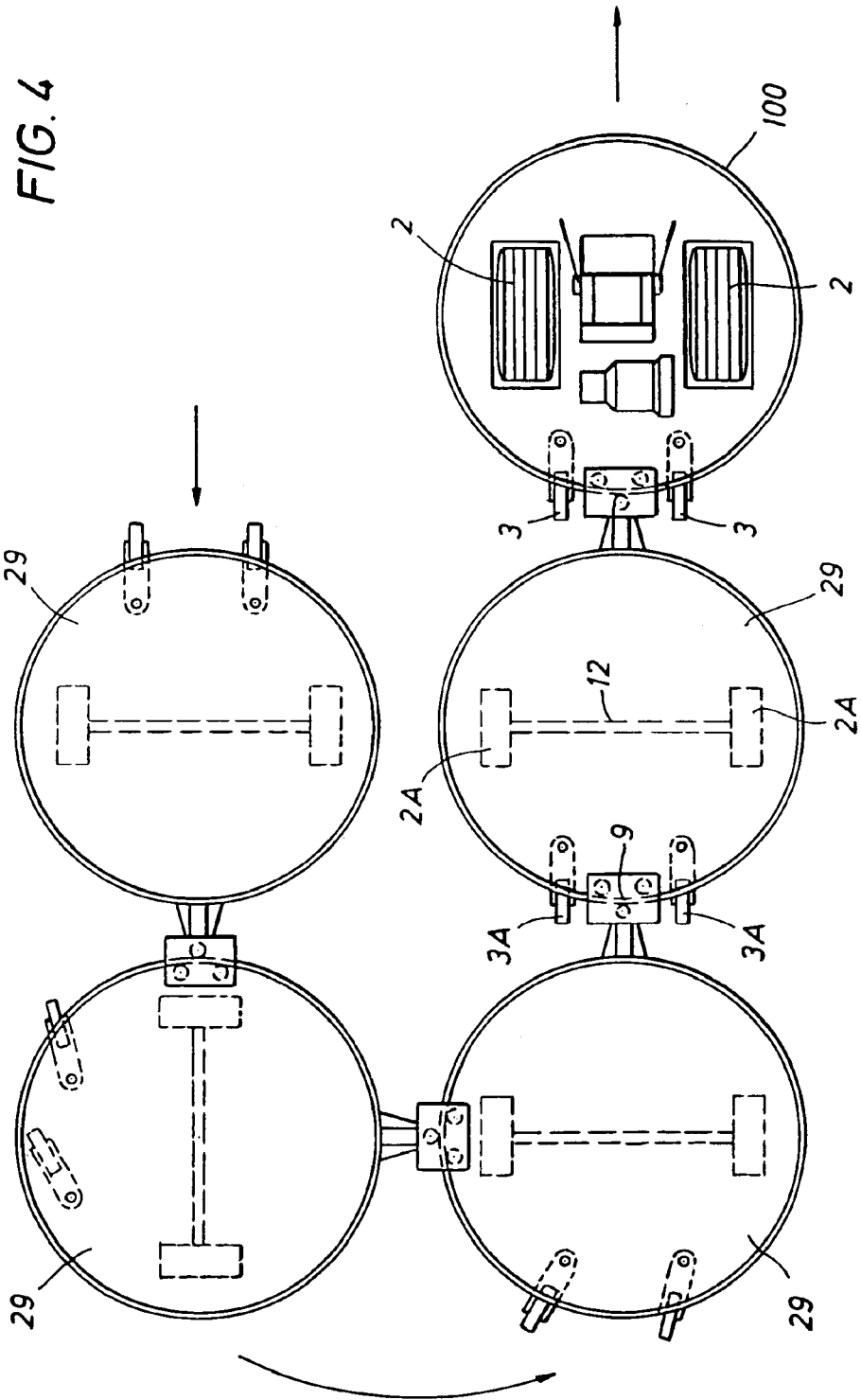

OMNI DIRECTION VEHICLE

This application is a divisional of application(s) application Ser. No. 09/919,653 filed on Jul. 31, 2001, now U.S. Pat. No. 6,581,703.

CROSS REFERENCE TO RELATED APPLICATION

This non-provisional application claims priority under 35 USC 119(e) from provisional application Ser. No. 60/221,802 filed on Jul. 31, 2000.

BACKGROUND OF THE INVENTION

1. Field of the Invention

This invention relates generally to a wheeled vehicle designed to turn about a vertical axis. In particular, the invention relates to powered utility riding vehicles of the type useful for aircraft servicing operations, airport passenger vehicles, lawnmowers, warehouse utility vehicles, wheelchairs, or in any vehicle where rotation-in-place steering is advantageous.

2. Description of Prior Art

Prior art vehicles are known for turning with a zero turning radius, or so called "turning on the spot." U.S. Pat. No. 3,938,608 describes a vehicle with a single center mounted pivoting drive motor that is rotated about a vertical axis in order to change directions of the vehicle. The '608 vehicle is supported with three or more swivel wheels located at equal radial distances from the center wheel. The '608 outer profile is in the shape of a rectangle and has appendages that make close proximity maneuvering impossible next to another object such as a post or another vehicle. Furthermore, the '608 vehicle lacks tractive force because of the single drive wheel. Furthermore, a single drive wheel must be rotated in order to change the vehicle direction, and although the single drive wheel can be turned to direct the vehicle in any direction, it does not provide directional stability for the case where a force is exerted on the vehicle from an angle to the line of intended travel. For example, a force against the '608 vehicle at a 20° angle to the right or left of the line of travel would force the single '608 wheel to skid, causing loss of directional control.

The prior art concerning aircraft service vehicles has not fundamentally changed in the last fifty years. Conventional tow vehicles for aircraft, often called tractors, are typically configured with two axles, one in front, the other in the rear. The rear axle is fixed to the vehicle and provides motive force; two additional wheels are located at the front end of the vehicle, each being steerable and connected together to provide steering of the vehicle. Since there is a distance between the fixed rear drive wheels and the axis of the steerable wheels at the front end of the vehicle, a turning radius is required that far exceeds the space actually occupied by the vehicle itself. The longer the distance between front and rear axles, the larger the turning radius that is required to change directions of the vehicle. A large turning radius makes maneuvering around crowded airport ramp areas difficult and often dangerous. Operators are required to look over their shoulders in order to back up, and congestion is commonplace at airport and air service facilities. All the vehicles around an airport ramp share these common shortcomings. A need exists for a service vehicle that requires less square footage for its footprints as well as the space required for maneuvering so that operator safety and the safety of the aircraft are enhanced.

Mowing vehicles share common problems with those of aircraft service vehicles. Commercial mowers used to mow highways and large areas commonly use row-crop tractors to pull the mowers. Such tractors are designed to pull heavy loads such as plows in a straight line with few turns, but mowing requires maneuvering around obstacles such as post, rails, and curbs. Furthermore, mowing must be for ravines, ditches and on hillsides. Rolling over or tipping of such equipment is a common problem and safety hazard. A vehicle that requires no more room than it occupies in area for maneuvering and having a low center of gravity would be very advantageous for all commercial mowing applications.

3. Identification of Objects of the Invention

A primary object of this invention is to provide a service vehicle that has enhanced maneuverability.

Another object of the invention is to provide a service vehicle that can turn on the spot and be of the smallest physical size relative to the space it occupies.

Another object of the invention is to provide a service vehicle which reduces the risk of accidents which result in damage or injury to equipment or operating personnel.

Another object of the invention is to provide a service vehicle having an outer perimeter that defines an outer imaginary cylinder that encloses any equipment or appendages mounted on the vehicle thereby enhancing its capability to maneuver the vehicle without hanging up on objects external to the vehicle.

Another object of the invention is to provide a service vehicle with structures mounted thereon for materials handling or people transport.

Another object of the invention is to provide a service vehicle that can be used for towing, pushing or handling aircraft equipment.

Another object of the invention is to provide a mowing machine that can turn on the spot and maneuver easily about obstructions.

Another object of the invention is to provide a people-moving cart for use at an airport, where the cart can turn around on the spot and be of the smallest physical size relative to the space it occupies.

SUMMARY OF THE INVENTION

The objects identified above along with other features and advantages of the invention are incorporated in a vehicle that, due to a combination of its characteristics including its shape and the configuration of its drive wheels, provides unique maneuverability and efficiency. When the vehicle is combined with a radial movable hitch to its circular frame, such combination provides for free circumferential attachment to and movement of other vehicles for transport of such vehicles with minimal space required for maneuverability and safety of operation. Such vehicles include aircraft baggage loading equipment, baggage carts, tractors and other wheeled equipment adapted for aircraft and airport operations.

The vehicle according to the invention has a frame with a perfectly round outer surface about its perimeter with no external appendages. That outer surface is characterized as a perfect, unobstructed smooth circle defined by a vertical axis of the vehicle. The vehicle has two independent drive wheels located on a horizontal axis which intersects the vertical axis. Each wheel is at exactly the same distance from the vertical axis, with each wheel having the capability to move independently and at infinitely variable speeds in either direction. Thus, the vehicle is capable to move in any direction by rotating the axis of the drive wheels perpendicular to the desired direction of travel. By applying motive force to the wheels in the appropriate direction and speed, the vehicle can turn and move in any direction perpendicular to the axis of the drive wheels within the area covered by its circumference. Rotating about the vertical axis to any radial position without changing its original footprint, the vehicle requires a true zero turning or maneuvering radius, and thus requires only the space that it occupies in which to maneuver in any direction. The "footprint" is the area on the ground below the vehicle when it is at rest.

The capability to maneuver with a zero turning radius in addition to having a perfectly round and smooth perimeter with no apparatus which is mounted on the frame of the vehicle which extends beyond the outer perimeter of the frame provides for virtually unlimited directional movement and requires no maneuvering space beyond the area or footprint covered by the vehicle itself. The space required of the vehicle is no greater than that of a conventional vehicle with a drive axle and a steering axle.

One embodiment of the invention is in a vehicle capable of pulling single or multiple pieces of equipment such as trailers or various sized objects such as aircraft. In this configuration as a tow vehicle or tractor, the vehicle is equipped with a smooth outer ring including upper and lower rails which support a trolley. The trolley includes a plurality of precision wheels or rollers that are rotatably coupled to the upper and lower rails of the outer ring and enable the trolley to move freely around the entire circumference of the outer rim of the vehicle. The trolley can be rotated either manually, or through the use of a motor, for positioning the trolley to the desired position at any point about the circumference of the vehicle prior to connection to the object to be moved. Attached to the trolley or "truck assembly," via a hitch is a pivoting arm that can be stored in the vertical position perpendicular to the ground, or when in use, lowered to a position approximately parallel to the ground where it may then be attached to either a towable trailer or another object to be moved such as an airplane. The connecting arm is capable of movement about an arc vertically from its pivot point, but not laterally relative to the pivot point.

When the connecting arm is then connected to the object to be moved, and after the axis of the tow vehicle drive wheels is positioned (by operator action) perpendicular to the desired direction of movement, the tow vehicle exerts a pushing or pulling motive force against the object (e.g., trailer or airplane) being towed or pushed. The direction of travel of the towed or pushed object can be changed by adjusting the angle of the connecting arm or hitch relative to the direction of travel of the axis of the tow vehicle drive wheels. This is accomplished by rotating the axis of the drive wheels of the tow vehicle radially to any desired angle relative to the object being towed or pulled and then exerting forward or reverse power to the drive wheels. Because the trolley assembly to which the connecting arm is attached is capable of movement freely about the circumference of the tow vehicle, the angle of the connecting arm or hitch can constantly be adjusted to achieve the desired direction of travel of the object being pulled or pushed. This changing of relative angle and direction does not transmit any stress to the object being pushed or pulled, because the speeds of the drive wheels are continuously variable from zero to maximum and the trolley and arm move about the circumference of the tow vehicle with very little if any friction.

The arrangement of a substantially outer circular shape of a vehicle with a smooth and unobstructed outer perimeter in combination with two, independently variable speed bi-directional drive wheels located on a single axis through the exact center of the vehicle and mobile connecting point or hitch that is free to move about the full circumference of the vehicle working in conjunction with a perpendicularly fixed connecting bar results in a tow vehicle characterized by the ability to move omni-directionally about a given point, change directions with zero maneuvering room beyond the physical footprint of the vehicle, and push or pull other mobile vehicles with precise control. Such characteristics reduces the operating space on the ground required to move or handle an object being manipulated thus increasing operating efficiency. Safety is increased because the operator of such a vehicle, positioned directly at the center of the tow vehicle, can always be facing the direction the vehicle is moving, never having to back up and look backward.

Whether pushing or pulling another object such as an aircraft or trailer or cart, the field of vision of the operator of the tow vehicle is always facing the direction of movement of the vehicle. In operation, the operator rotates the axis of the drive wheels until it is perpendicular to the direction of the desired travel by rotating one wheel in one direction and the other in the opposite direction. Once the desired drive axle orientation is reached (perpendicular to the desired direction of travel), both wheels are given power equally, causing the vehicle to move in the direction perpendicular to the drive wheel axis of the tow vehicle axle. The vehicle being towed or pushed is then steered in the new direction and the angular attitude between the tow vehicle and the steering axle of the vehicle being towed or pushed automatically comes into an appropriate geometry as the radial hitch travels about the perimeter of the tow vehicle.

BRIEF DESCRIPTION OF THE DRAWINGS

The invention is described below with reference to preferred embodiments which are illustrated by drawings of which:

FIG. 4 illustrates an ODV pulling trailers which are configured in the same manner as the ODV but without drive power capability to their wheels;

DESCRIPTION OF THE PREFERRED EMBODIMENTS OF THE INVENTION

Figure 1A:
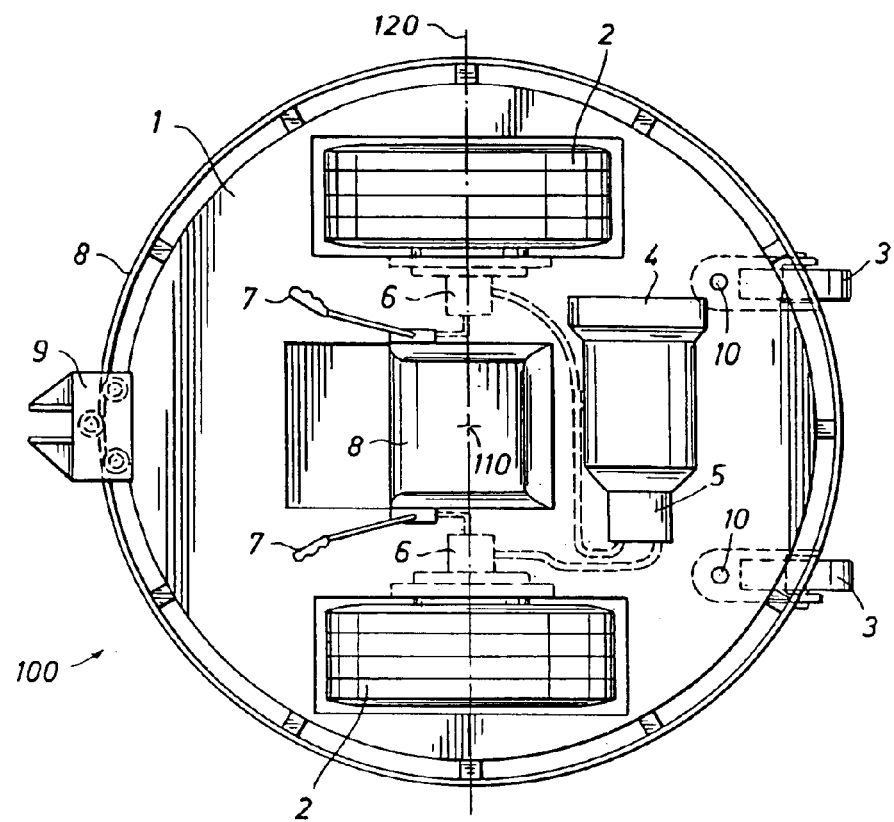
FIGS. 1A and 1B are top and side views of the Omni Direction Vehicle (ODV) according to the invention schematically showing major drive components, a circular rail about the frame of the ODV, and a trolley rotatably mounted on the rail.
Figure 1B:
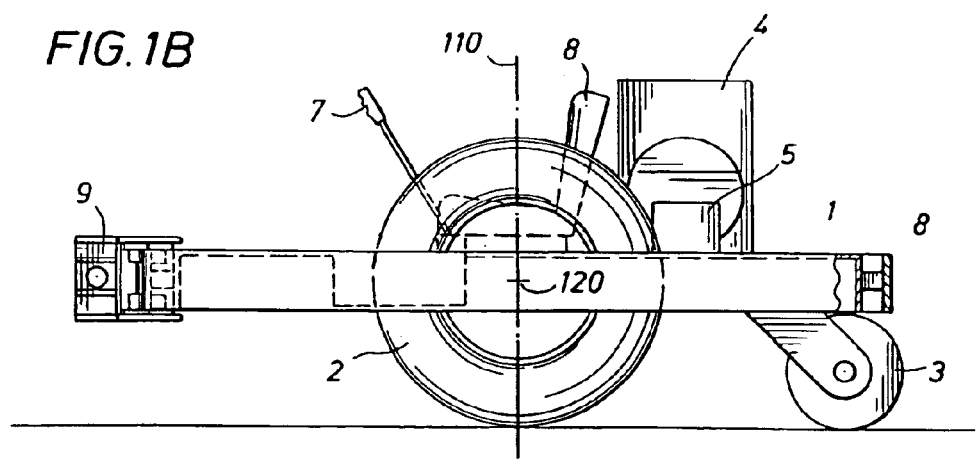

FIGS. 1A and 1B illustrate an Omni Directional Vehicle (hereafter ODV) according to the invention which includes primary wheels 2 mounted on a frame 1 which has an outer perimeter in the shape of a circle. The circular frame has a vertical axis 110, illustrated in FIG. 1B and which is perpendicular to the plane of the top view of FIG. 1A. The wheels 2 (powered in the powered version of FIGS. 1A, 1B, 3A, 3B, etc., but unpowered in the trailer version of FIG. 4) are mounted along a horizontal axis 120 which is perpendicular to the vertical axis 110 and intersects the vertical axis 110 as shown in FIGS. 1A and 1B. Two swivel castor wheels are pivotably mounted to the frame at the rear of the ODV 100.

In the powered version of the ODV 100, a power source 4 mounted on the frame 1 is provided for driving hydraulic pumps 5. The power source 4 may be a diesel or gasoline engine or an electric motor/battery assembly. The pump 5 provides balanced pressurized hydraulic fluid to separate hydraulic motor 6 gearbox assemblies, one for each wheel 2. The speed and direction of rotation of motors 5 and wheels 2 is controlled by control levers 7 which operate hydraulic control valves (not illustrated) coupled to hydraulic motors 6. The control levers 7 and valves operate exactly the same for each of the left and right wheels 2. Each lever 7 and valve has a neutral position, such that when a lever is at such neutral position, a wheel associated with that lever is hydraulically braked. If a lever is moved forward, the wheel motor 6 begins to move slowly forward for turning a respective wheel 2. The greater distance that a lever 7 is pushed or pulled from its neutral position, the faster the wheel motor 6 turns, thereby causing the wheel 2 to which it is coupled to increase in speed. A seat 13 for the operator is mounted on frame 1 with the vertical axis 110 passing through it.

If both levers 7 are moved in the same direction and amount and at the same time, both drive wheels 2 move at the same speed, thereby causing straight-ahead movement of the ODV over the ground. That movement is perpendicular to the horizontal axis 120. If the levers 7 are pushed forward or backward at an unequal distance from each other, a lever moved the greatest distance will produce a greater speed of rotation than the other one, causing the vehicle to turn with the vehicle turning about the wheel that is turning slower. For example, if the right control lever 7 is pushed farther forward than is the left lever 7, the ODV 100 turns to the left, and vice versa.

If the right lever 7 is moved forward and the left lever 7 is moved backward, and both lever positions are the same in amount and opposite in direction, the left wheel turns backward, the right wheel turns forward both at the same rate of rotation and the ODV 100 turns in its own space or footprint without moving from that footprint while it is turning. The footprint over the ground is the area of the ground beneath the circular frame 1. The counter clockwise rotation described above, becomes a clockwise rotation when the right wheel 2 rotates backward at the same rate as the forward rotation of the left wheel 2. Thus, the ODV 100 in its basic form can change its heading while not varying its footprint over the ground during such a change of heading. That means that if the ODV does not interfere with any object on the ground, with one heading, that heading can be changed without fear of interfering with any object on the ground, because the ODV footprint does not change during heading correction.

The two wheels 2 (or main wheels of the trailer of FIG. 4) are located in the exact center axis of the vehicle. Two additional swivel wheels or castors 3 (as best illustrated in FIGS. 1A, 1B) are mounted at the rear of the vehicle. The castors 3 provide support for balancing the weight of the vehicle, because the power source 4 and other ballast weight (if desired) is used to counterbalance the ODV 100 and keep the frame 1 substantially level. The rear swivel castors 3 support this counterbalanced weight. The swivel castors 3 are mounted on the frame 1 at positions so as not to protrude from the outer circumference of the vehicle when the vehicle is turning about itself (i.e., spinning) about vertical axis 110 in order to assure that there are no external appendages on the vehicles that could touch or catch other objects while the ODV 100 is spinning about axis 110. When the ODV 100 moves forward, the castors trail outside the outer circumference of the ODV frame 1 without any substantial effect on the obstruction free characteristics of the vehicle. One or more swivel castors 3 may be employed depending on weight and application of vehicle 100.

Figures 2A, 2B:
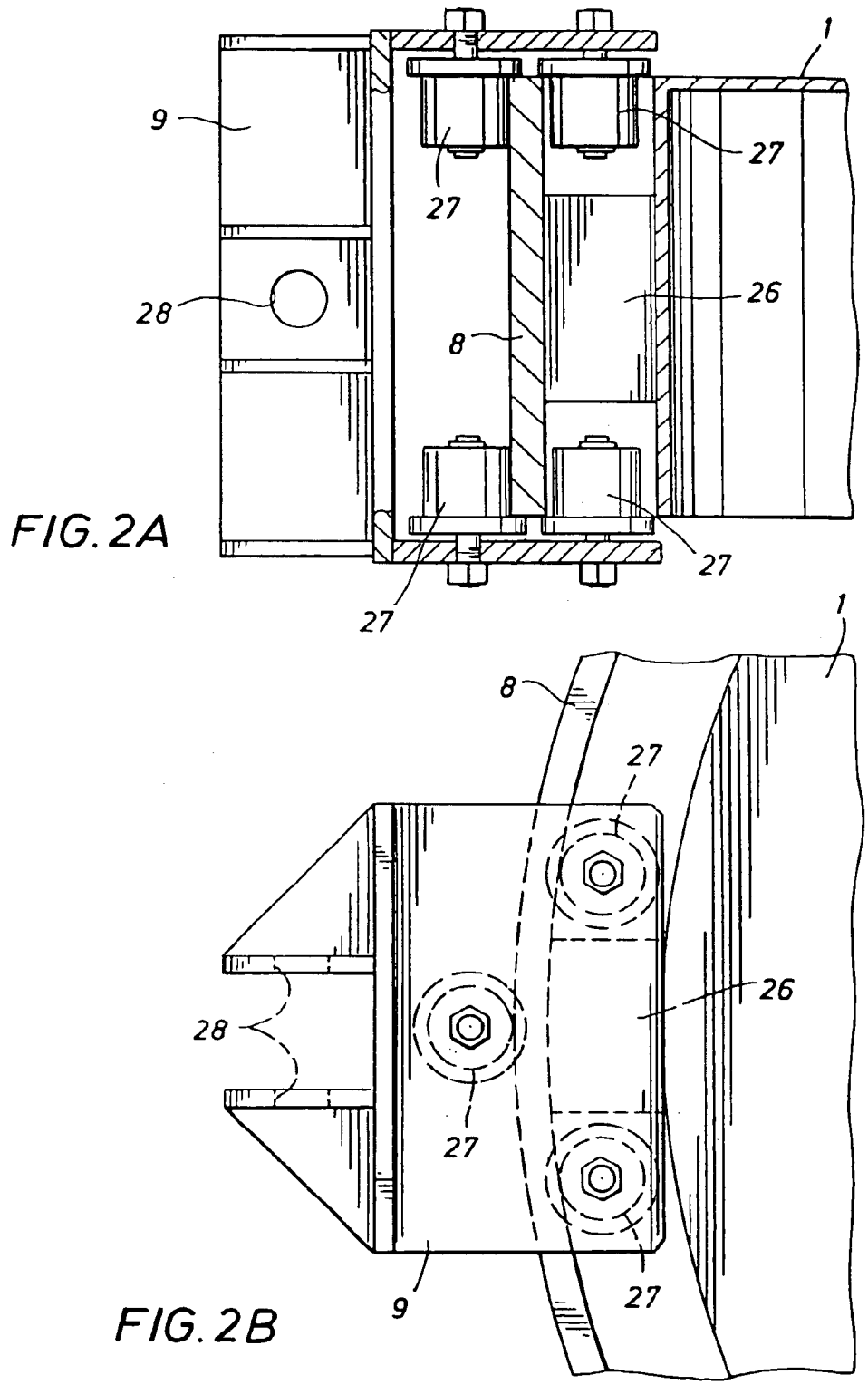
FIGS. 2A and 2B are side and top views of a hitch mounted on the trolley with a more detailed illustration of rotatable mounting of the trolley on the circular rail of the ODV.

The hitch rail 8 is mounted to the frame 1, for example via a plurality of mounting plates or stanchions 26 (see FIGS. 2A, 2B). The hitch rail 8 provides a smooth running surface for at least one hitch trolley assembly 9. Where the ODV is arranged and designed as airport service operations, for example, two or more trolley assembly may be designed for different hitch arrangements, one for pushing an aircraft to or away from the terminal, another for service trailers, and so on. The hitch assemblies may be manually rotated about rail 8 or they may be rotated by powered assemblies with electric or hydraulic motors for example. Plural trolleys 9 (only one of which is illustrated in FIGS. 1A, 1B) may be coupled together so that they move in tandem or separately depending on the application.

FIG. 2A illustrates a side view of the hitch rail 8 and its attachment to the main frame 1 with stanchions 26 spaced around the circumference of the vehicle. Trolley cams 27 located on the side of the rail 8 on the top and the bottom of the rail 8 support the trolley 9 and provide a mounting platform for various hitches and connections to the ODV 100. The cams are positioned preferably with one upper and lower cam set 27 outboard of the rail 8, and with two upper and lower cam sets 27 inboard of the rail 8. The mounting positions of the outboard cams and the inboard cams are with respect to the trolley 9 so that the radius of curvature from inboard cam set 27 to the outboard cam set 27 is substantially the same as the radius of curvature of the rail 8, thus allowing the trolley to rotate smoothly with minimum friction and resistance about rail 8. This freedom of movement reduces stress on the vehicles being moved, such as aircraft that typically have delicate landing gear. FIG. 2B illustrates the trolley 9 from a top view. The two cams 27 located inboard of the rail 8 and one cam 27 located outboard of the rail 8 trap the rail 8 with substantially no looseness.

Figure 3A:
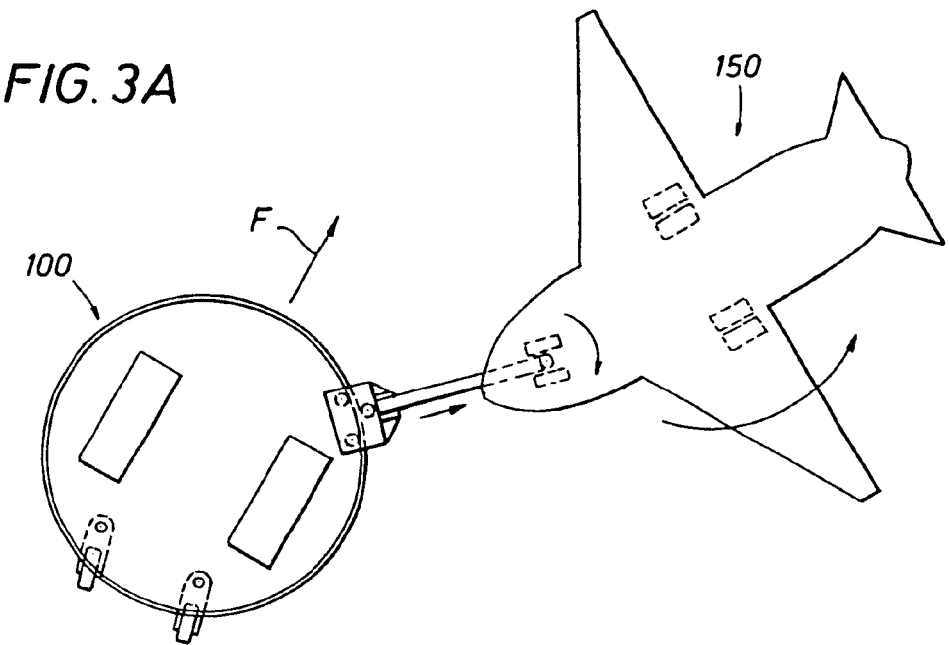
FIGS. 3A and 3B are illustrations of the ODV pushing an airplane such that airplane is caused to turn while being pushed.
Figure 3B:
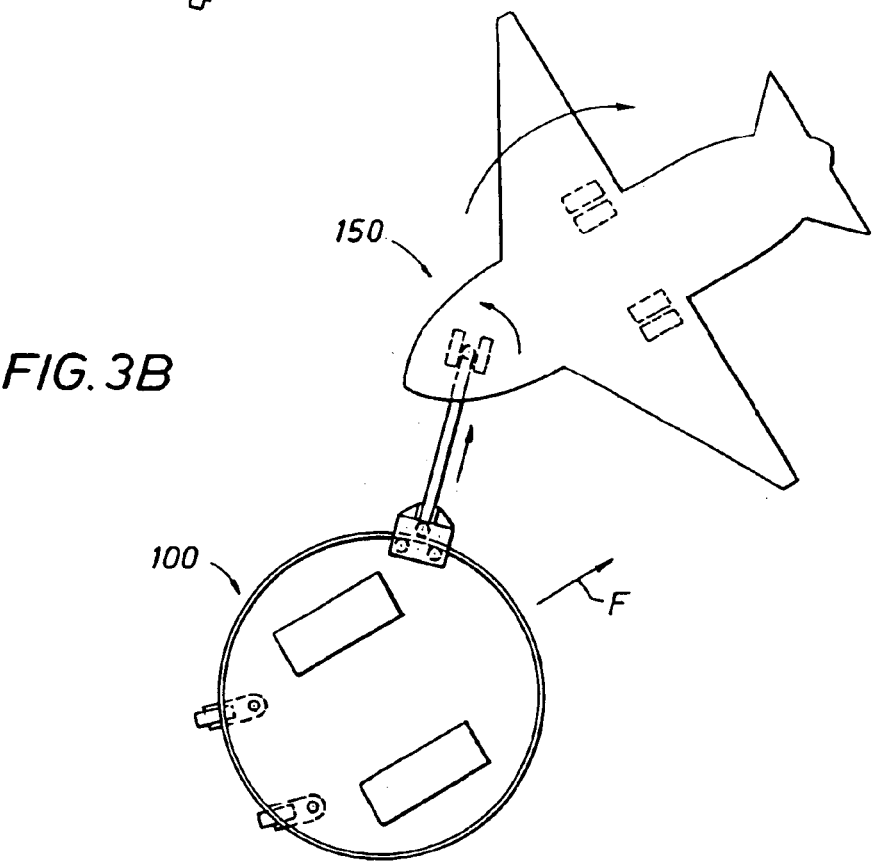

FIG. 3A illustrates the ODV 100 pushing an airplane 150 by rotating wheels 2 of the ODV 100 such that the forward direction of the ODV 100 as depicted by the arrow F. The forward direction is perpendicular to the horizontal axis running through the wheels 2. The arrow F is directed to the left of the centerline of the airplane and with both wheels moving forward at the same rate, the nosewheel of the airplane is turned to the left, causing the airplane to move in a counter clockwise arc as it is pushed rearward. FIG. 3B shows the opposite maneuver, when the ODV 100 is rotated to the right in the sane manner, causing the opposite movement of the nosewheel and a clockwise rotation of the airplane 150 as it is pushed rearward. In this manner, the ODV 100 is capable of controlling the direction of movement of the airplane in a smooth, uninterrupted manner. Because the controls 7 of the drive wheels 2 of the ODV 100 are continuously variable, and very smooth, it is possible to move at only creeping speeds up through maximum travel speeds without changes in gears or interrupting the movement of the airplane 150 or other object being pushed.

FIG. 4 illustrates a powered ODV 100 pulling a series of trailers 29 each configured with the same round shape and hitch trolley as the ODV tractor 100. The main wheels 2A are located on the center axis 120A of the perfectly round trailers and have castors like the ODV. The hitches 9 working in concert with the tractor 100 enable the train of trailers to move in very close proximity and use very little maneuvering room.

The description of the ODV 100 above shows its usefulness as a pushing or pulling vehicle for airport operation. The ODV of the invention described above can also serve as the basis for other service vehicles.

Figure 5A:
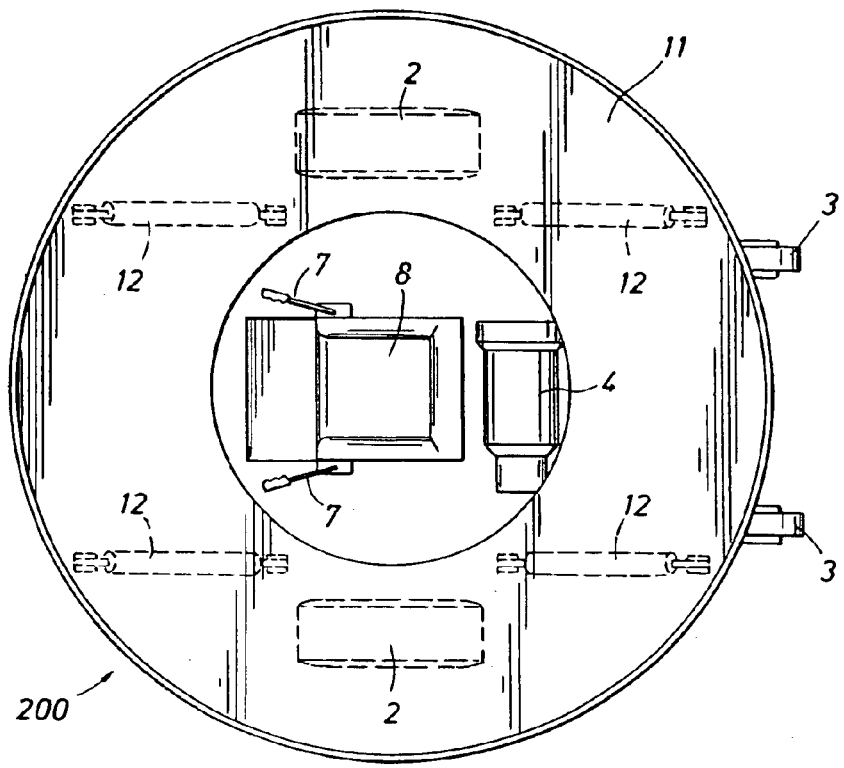
FIGS. 5A and 5B illustrate, with top and side views, an ODV according to the invention configured as a baggage vehicle for transporting and loading baggage to and from the baggage compartment of an airplane as illustrated by FIG. 6.
Figure 5B:
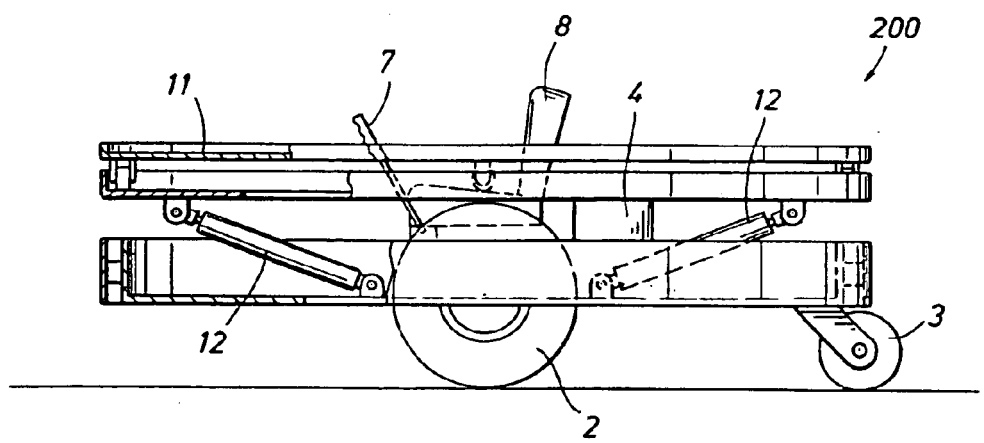
Figure 6:
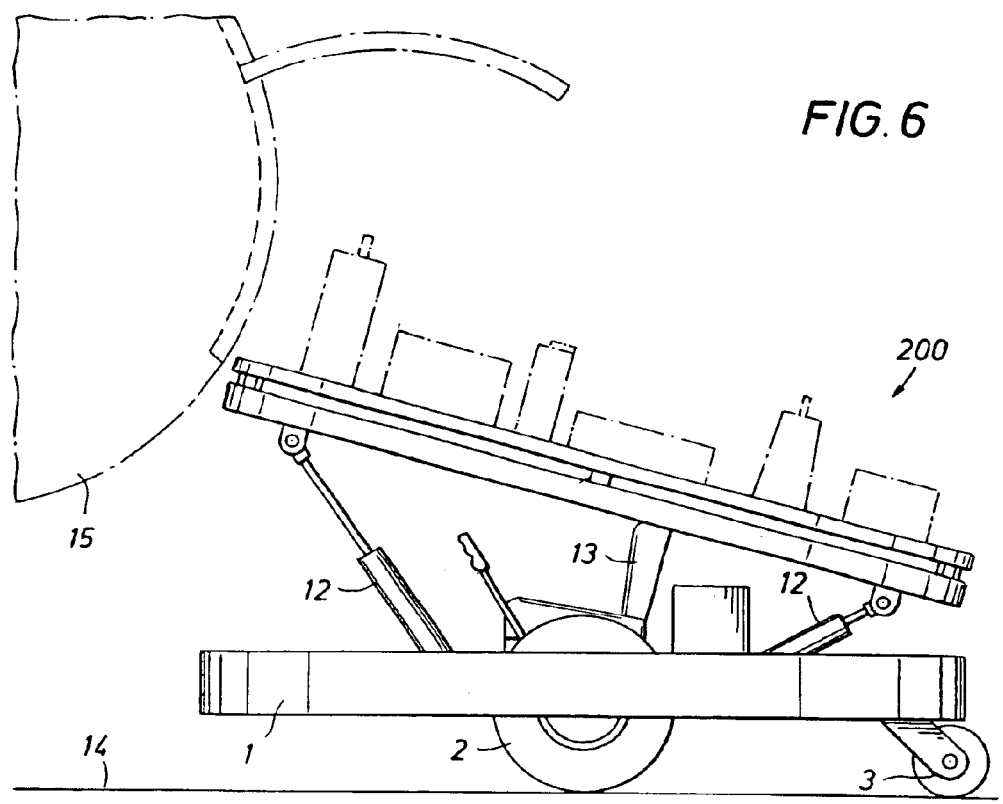

FIGS. 5A and 5B illustrate a baggage loading/unloading vehicle 200 which utilizes a similar frame and undercarriage as illustrated in FIGS. 1A and 1B but a trolley hitch is not necessarily required. The upper surface of the vehicle 200 supports an annular carousel or conveyor 11 that is used to support baggage and other freight as it is being unloaded off an airplane. The operator sits in the center of the carousel 11 for moving the vehicle 200 from the aircraft to a baggage room, etc. When the carousel 11 of the vehicle 200 reaches the side of the aircraft, it is hydraulically elevated by hydraulic pistons 12 (as illustrated in FIG. 6) to accept baggage from the floor of the aircraft 15 and transport the baggage to ground level where it may be loaded onto waiting trailers or carts for transport. Because the carousel 11 is of an annular shape and without end, freight handlers are able to continue loading its flat surface as it rotates until it is full. Unlike straight conveyor belts that become full and dump freight off the end onto the ground, the ODV carousel accepts baggage until there is no further room, but when full, the rotating movement of the carousel does not dump the baggage to the ground. The arrangement of FIG. 6 can be built on any scale with segmented and hinged carousel surfaces for transport as required for larger aircraft.

Figure 7A:
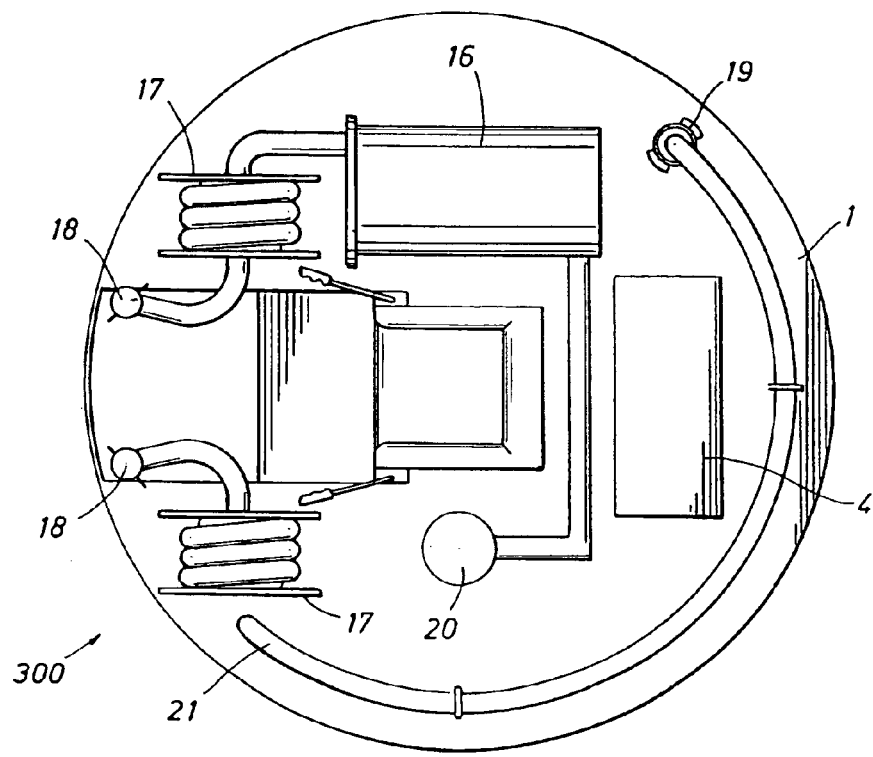
FIGS. 7A and 7B are top and side views of an ODV according to the invention configured as a hydrant vehicle for fueling an aircraft.
Figure 7B:
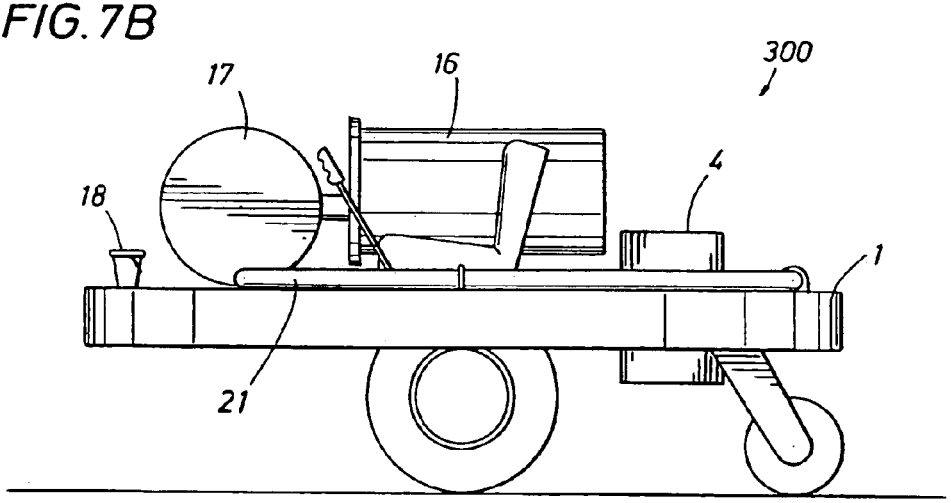

FIGS. 7A and 7B illustrate the ODV principle as described above in a vehicle outfitted as a hydrant refueler 300. In this arrangement, the same undercarriage is used as the ODV tow vehicle of FIGS. 1A, 1B; however, on the top of the chassis or frame 1, several elements are mounted: one or more hose reels 17 with single point nozzles 18, a filter separator 16, a meter 20 and a hydrant connection 19 with an articulated hard pipe arm 21 that allows for connection to underground hydrant fuel systems. Maneuvering of hydrant refuelers around crowded airport ramps under the wings of commercial aircraft can be difficult and dangerous due to the flammable nature of fuel. The ODV hydrant refueler of FIGS. 7A, 7B enables safer maneuvering without maneuvering space other than that that the vehicle occupies.

Figure 8A:
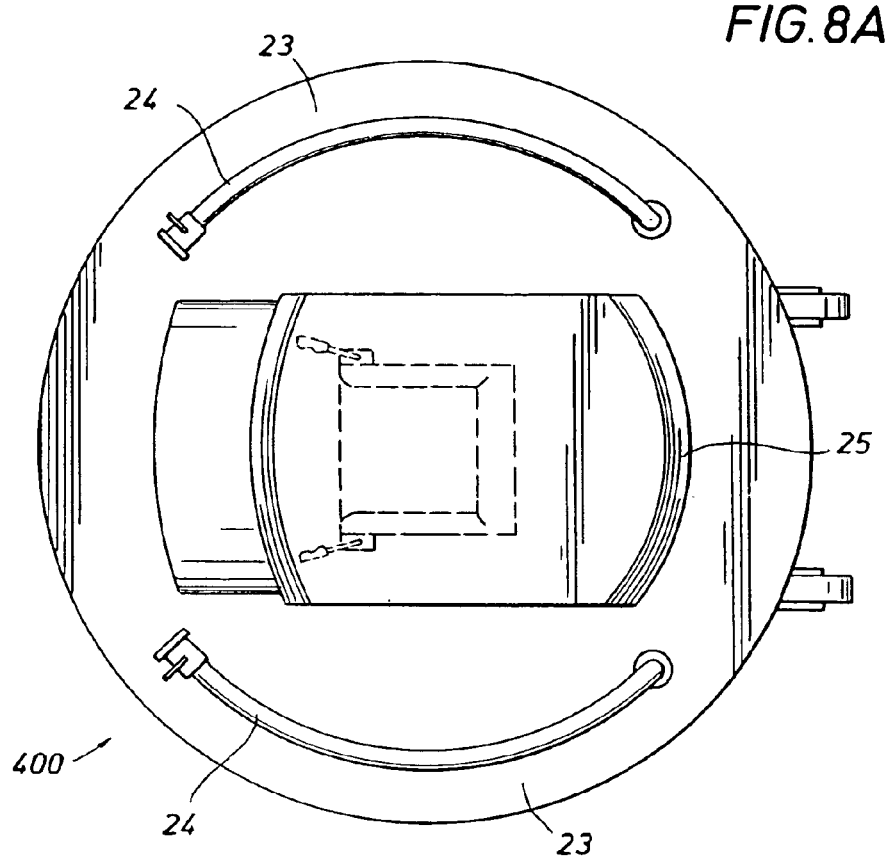
FIGS. 8A and 8B are top and side views of an ODV according to the invention configured as a sanitary service tank truck for servicing an aircraft.
Figure 8B:
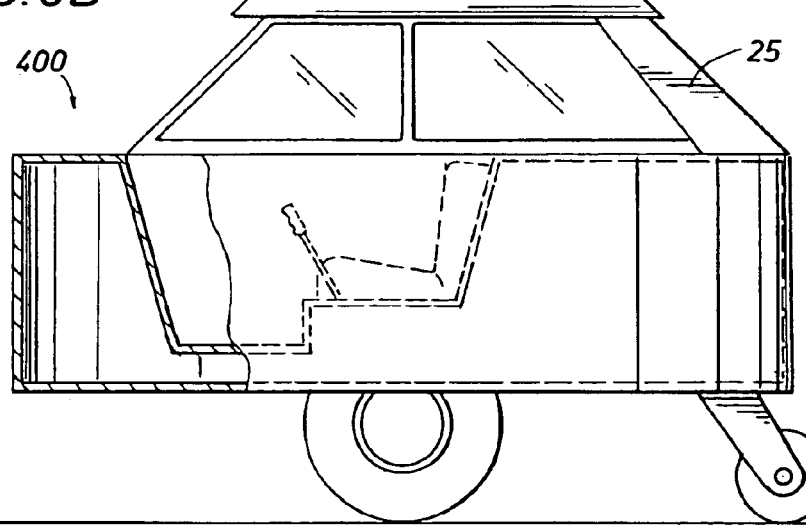

FIGS. 8A and 8B illustrate the ODV principle as described above configured as a tank vehicle 400 that is used to service the sanitary discharge of commercial aircraft, or to deliver fresh potable water during servicing at the gates between flights. The entire chassis 23 is constructed as a cylindrical tank for holding liquid. The outside of the tank is round and to be dimensioned to be within the circular radius of the frame of the vehicle. Appropriate drive wheel capacity and hose 24 connections are provided with hydraulically driven pumps (not shown) to move the various liquids. The maneuverability of the vehicle 400 makes it easier to navigate crowded ramp areas of airports.

Figure 9:
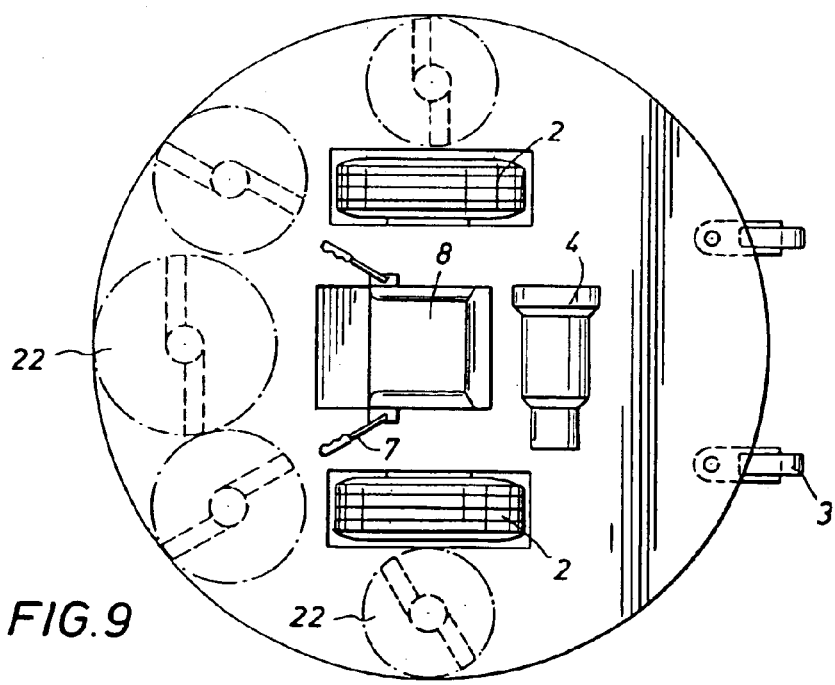
FIG. 9 is a top view of an ODV without a trolley according to the invention configured as a mowing machine.

FIG. 9 illustrates a mowing tractor 500 based upon the ODV principle described above. A plurality of appropriately sized and spaced rotor cutting blades 22 provide for a full cutting swath equal to the maximum diameter of the vehicle. The unique maneuvering capabilities of the ODV make mowing around signs, posts, railing, curbs and other obstacles much more efficient. Because the vehicle has an extremely low center of gravity, rollover is virtually eliminated. Accessory items such as full gimbal mounting of the driver's seat make hillside operation safe. The main chassis can be segmented from front to rear making navigation of uneven surfaces possible. Such uneven surfaces include sides of ditches or ravines.

Figure 10A:
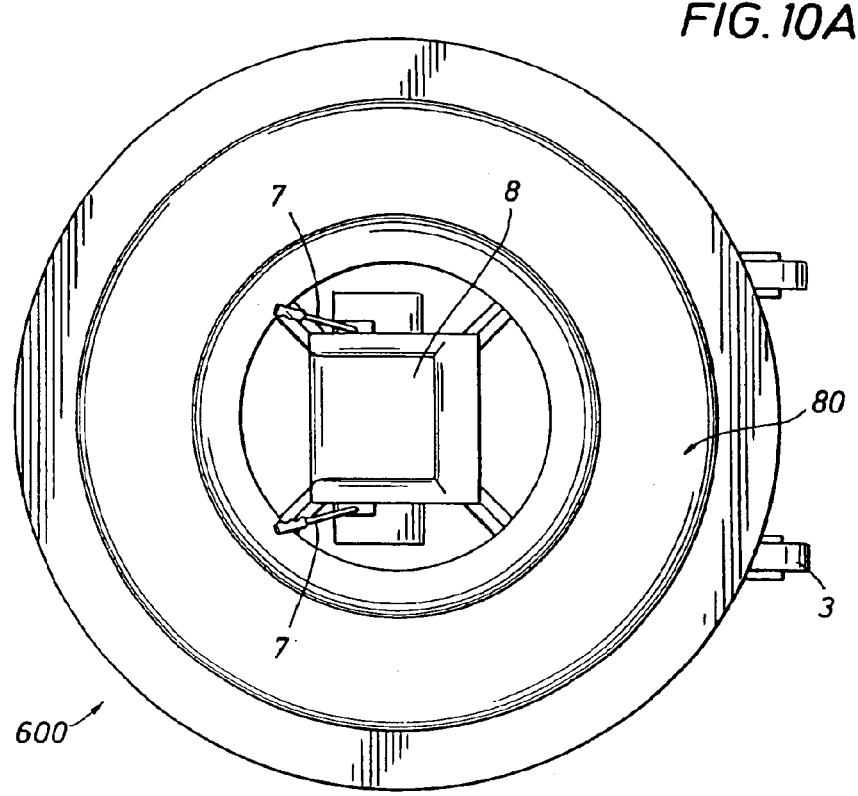
FIGS. 10A and 10B are top and side views of an ODV according to the invention configured as a passenger cart for airport operations to transport passengers between locations in an airport.
Figure 10B:
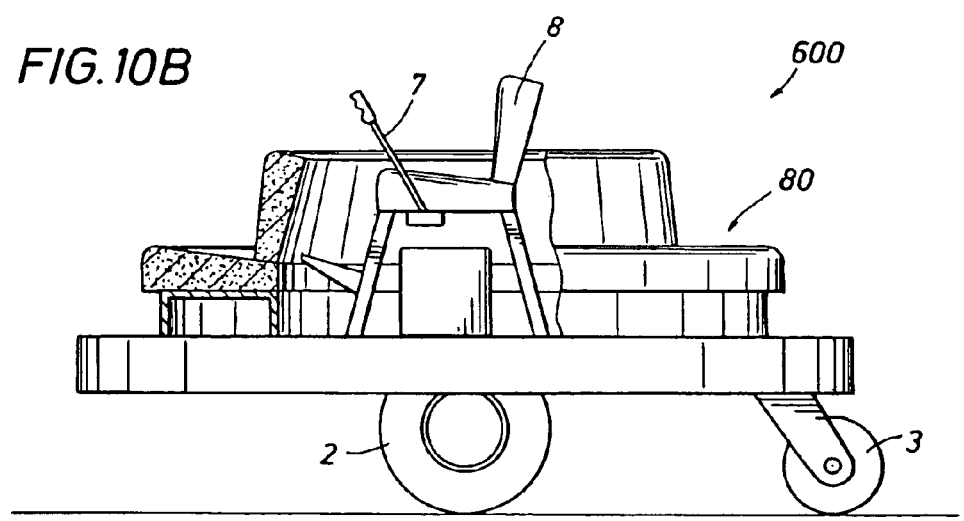

FIGS. 10A and 10B illustrate a passenger cart 600 for air terminal passenger transport based upon the ODV principle discussed above. An annular shaped bench 80 is secured to the frame of the vehicle. The operators seat 8 and control levers 7 are mounted higher on the vehicle to enable the operator to view the airport terminal over the passenger seated on the bench 80. In operation, the operator loads passengers for seating on the bench 80. Preferably the passenger seat faces outwardly from the center of the vehicle. When the operator must turn the cart 600 around, the vehicle turns on the spot and after turning 180°, for example, is capable of turning around with zero turning radius.

As described above, an ODV vehicle of the invention is characterized by a perfectly round outer perimeter with no appendages extending radially from that outer perimeter that can hang up or catch on objects or equipment on the ground. The ODV arrangement with drive or main wheels positioned along a horizontal axis that runs through the center of the circular frame, and where both wheels function independently of each other in forward and rearward directions provides a basis for many service vehicles, some of which are described above.

The invention as described above is defined by the claims which follow.

What is claimed is:

1. A tow tractor and trailer combination comprising tractor having a tractor frame having a top side, and with an outer tractor rail which is secured radially outwardly to said tractor and which is in the shape of a circle defined about a vertical axis through said tractor frame, said tractor having no apparatus mounted on the top side of said tractor frame which extends beyond the circular radius of said outer tractor rail, first and second drive wheels coupled to said frame, each of said drive wheels capable of powered rotation about a horizontal axis that intersects said vertical axis, each of said drive wheels capable of forward and rearward rotation about said horizontal axis, at least one castor mounted to said frame for supporting said frame on the ground by at least said first and second drive wheels and said castor, and a tractor trolley rotatably supported on said tractor rail and including a tractor hitch for coupling to a first pull bar, said tow tractor having a power source mounted on said tractor frame and being arranged and designed when powered by said power source to spin about said vertical axis with no apparatus mounted on said tractor frame extending outwardly beyond said circular radius, and a trailer having a trailer frame with an outer trailer rail which is in the shape of a circle defined about a vertical axis through said trailer frame, first and second main trailer wheels coupled to said trailer frame, each of said main trailer wheels mounted for rotation about a horizontal axis that intersects said vertical axis through said trailer frame, at least one castor mounted to said trailer frame for supporting said frame on the ground by at least said first and second main wheels of said trailer and said castor, a trailer trolley rotatably supported on said trailer rail and including a trailer hitch for coupling to a second pull bar, said first pull bar being connected between said tractor hitch and said trailer frame.

2. An aircraft service vehicle comprising a frame supported on the ground by wheels and with an outer rail periphery which is in the shape of a circle defined by a radius about a vertical axis through said frame, said frame having no apparatus mounted thereon which extends beyond the radius of said circle of said outer rail periphery, said vehicle having a power source mounted on said frame with operation controls and being arranged and designed when powered by said power source to turn about said vertical axis with no apparatus mounted on said frame extending outwardly beyond said circular radius, with said wheels including drive wheels mounted on said frame along a horizontal axis which intersects said vertical axis, said drive wheels coupled to said power source and arranged and designed to rotate independently in forward and backward directions, an operators seat arranged and designed on said frame such that an operator sits substantially in the center of said frame.

3. An aircraft service vehicle comprising a frame supported on the ground by wheels and with an outer rail periphery which is in the shape of a circle defined by a radius about a vertical axis through said frame, said frame having no apparatus mounted thereon which extends beyond the radius of said circle of said outer rail periphery, said vehicle having a power source mounted on said frame with operation controls and being arranged and designed when powered by said power source to turn about said vertical axis with no apparatus mounted on said frame extending outwardly beyond said circular radius, with said wheels including drive wheels mounted on said frame along a horizontal axis which intersects said vertical axis, said drive wheels coupled to said power source and arranged and designed to rotate independently in forward and backward directions, and further comprising, an endless conveyor belt mounted on said frame, said conveyor belt being annular in shape and having an annular width which extends from an inner radius of an inner circle about said operators seat and defined about said vertical axis and an outer circle.

4. The aircraft service vehicle of claim 3 further comprising, means for raising an end of said conveyor belt for vertical alignment with an aircraft baggage door in an upper position or lowering same for vehicle translation.

5. An aircraft service vehicle comprising a frame supported on the ground by wheels and with an outer rail periphery which is in the shape of a circle defined by a radius about a vertical axis through said frame, said frame having no apparatus mounted thereon which extends beyond the radius of said circle of said outer rail periphery, said vehicle having a power source mounted on said frame with operation controls and being arranged and designed when powered by said power source to turn about said vertical axis with no apparatus mounted on said frame extending outwardly beyond said circular radius, with said wheels including drive wheels mounted on said frame along a horizontal axis which intersects said vertical axis, said drive wheels coupled to said power source and arranged and designed to rotate independently in forward and backward directions, and further comprising, aircraft fueling apparatus mounted on said frame.

6. The aircraft service vehicle of claim 5 further comprising, an operator seat mounted on said frame which intersects said vertical axis through said frame.

7. An aircraft service vehicle comprising a frame supported on the ground by wheels and with an outer rail periphery which is in the shape of a circle defined by a radius about a vertical axis through said frame, said frame having no apparatus mounted thereon which extends beyond the radius of said circle of said outer rail periphery, said vehicle having a power source mounted on said frame with operation controls and being arranged and designed when powered by said power source to turn about said vertical axis with no apparatus mounted on said frame extending outwardly beyond said circular radius, with said wheels including drive wheels mounted on said frame along a horizontal axis which intersects said vertical axis, said drive wheels coupled to said power source and arranged and designed to rotate independently in forward and backward directions, and further comprising, at least one tank mounted on said frame for holding liquids and a hose in fluid connection with said tank for servicing an aircraft.

8. The vehicle of claim 7 wherein, said at least one tank is arranged and designed for supplying potable water for onloading to an aircraft.

9. The vehicle of claim 8 wherein, said at least one tank is arranged and designed to carry wastewater for offloading from an aircraft.

10. The aircraft service vehicle of claim 8 further comprising, an operator seat mounted on said frame which intersects said vertical axis through said frame.

11. The aircraft service vehicle of claim 7 further comprising, an operator seat mounted on said frame which intersects said vertical axis through said frame.

12. An aircraft service vehicle comprising a frame supported on the ground by wheels and with an outer rail periphery which is in the shape of a circle defined by a radius about a vertical axis through said frame, said frame having no apparatus mounted thereon which extends beyond the radius of said circle of said outer rail periphery, said vehicle having a power source mounted on said frame with operation controls and being arranged and designed when powered by said power source to turn about said vertical axis with no apparatus mounted on said frame extending outwardly beyond said circular radius, with said wheels including drive wheels mounted on said frame along a horizontal axis which intersects said vertical axis, said drive wheels coupled to said power source and arranged and designed to rotate independently in forward and backward directions, and further comprising means carried by said frame for supporting passengers, and an operators seat mounted on said frame and intersecting said vertical axis through said frame with drive wheels mounted on said frame along a horizontal axis which intersects said vertical axis, said drive wheels coupled to said power source and arranged and designed to rotate independently in forward and backward directions, whereby airport passenger transport operations are enhanced by requiring zero turning radius.

13. The vehicle of claim 12 wherein said means carried by said frame is a circular bench, and said operators seat is elevated to a position enabling an operator to see above passengers seated on said bench.

14. An aircraft service vehicle comprising a frame supported on the ground by wheels and with an outer periphery which is in the shape of a circle defined by a radius about a vertical axis through said frame, said vehicle having a power source mounted on said frame with operation controls and being arranged and designed when powered by said power source to turn about said vertical axis, means carried by said frame for supporting passengers, and an operators seat mounted on said frame and intersecting said vertical axis through said frame with drive wheels mounted on said frame along a horizontal axis which intersects said vertical axis, said drive wheels coupled to said power source and arranged and designed to rotate independently in forward and backward directions, whereby airport passenger transport operations are enhanced by requiring zero turning radius.

15. The aircraft service vehicle of claim 14 wherein no apparatus mounted on said frame extends outwardly beyond said radius of said circle of said periphery.

* * * * *